No. 809,233. PATENTED JAN. 2, 1906.
F. TIEMANN.
SUGAR BEET SEEDER.
APPLICATION FILED MAY 1, 1905.

4 SHEETS—SHEET 1.

Witnesses
Inventor
Fred Tiemann
by Foster, Freeman & Watson
Attorneys

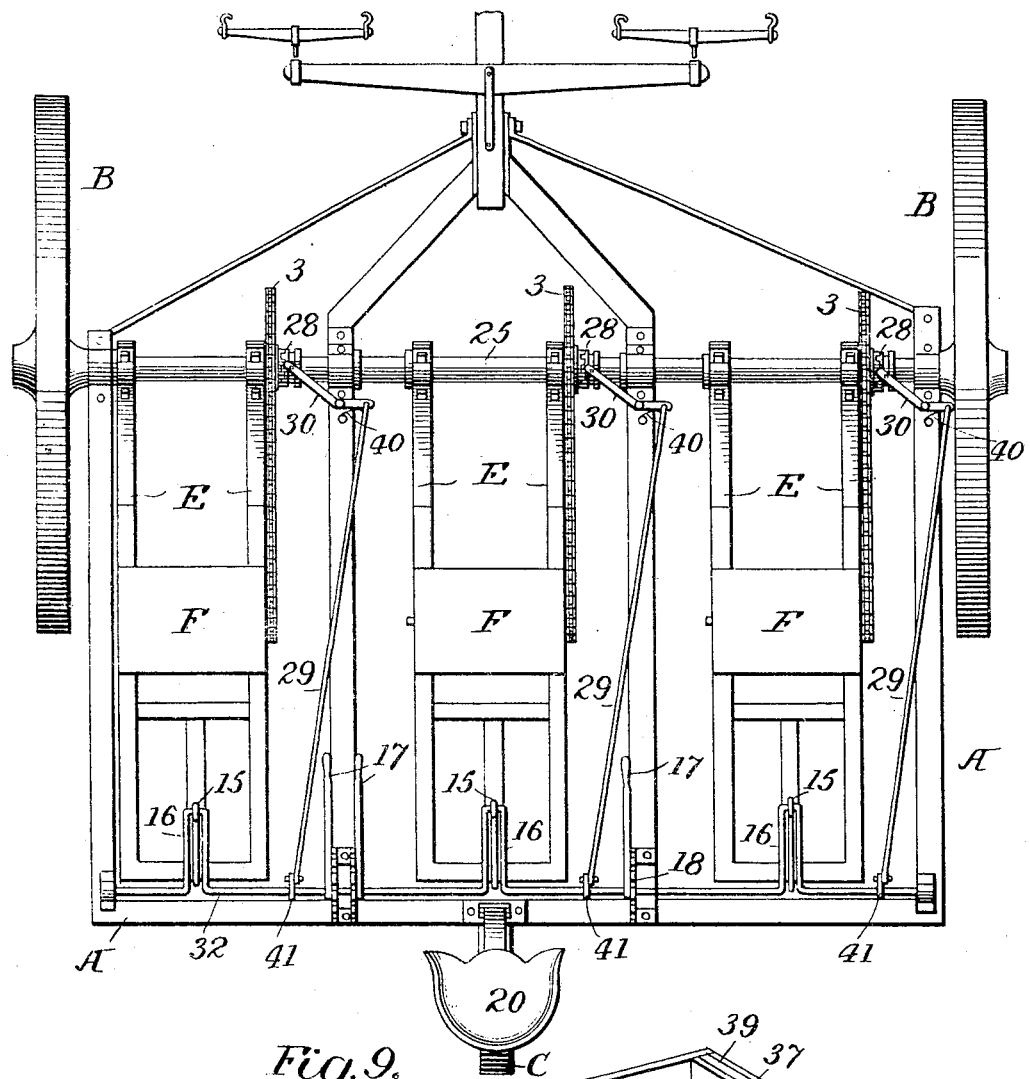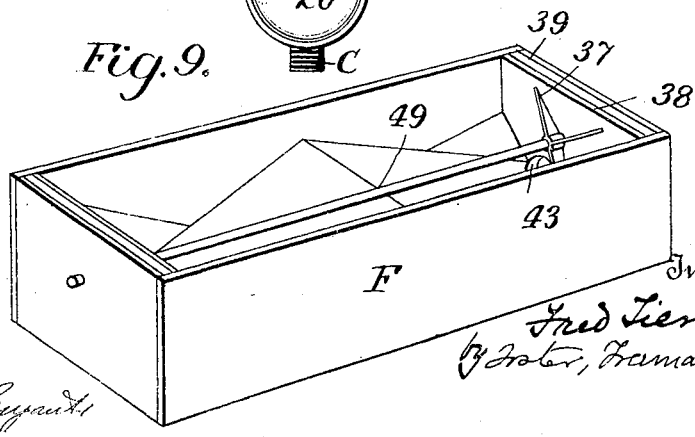

No. 809,233. PATENTED JAN. 2, 1906.
F. TIEMANN.
SUGAR BEET SEEDER.
APPLICATION FILED MAY 1, 1905.
4 SHEETS—SHEET 3.

No. 809,233. PATENTED JAN. 2, 1906.
F. TIEMANN.
SUGAR BEET SEEDER.
APPLICATION FILED MAY 1, 1905.
4 SHEETS—SHEET 4.
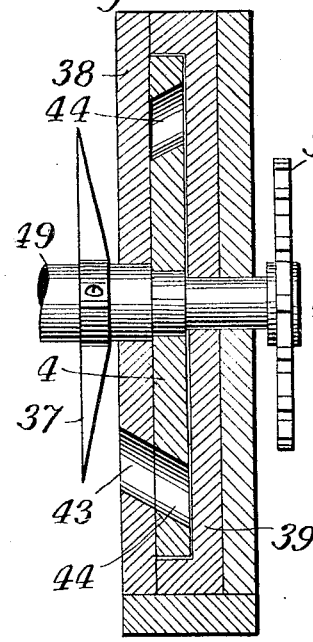
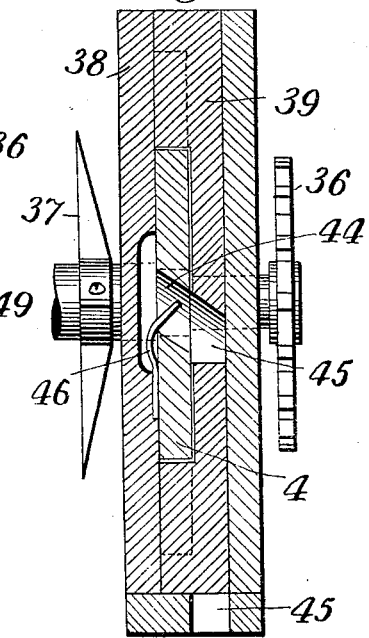
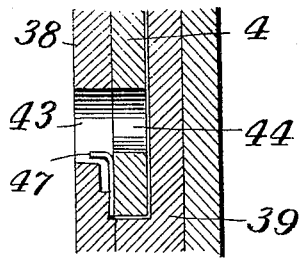
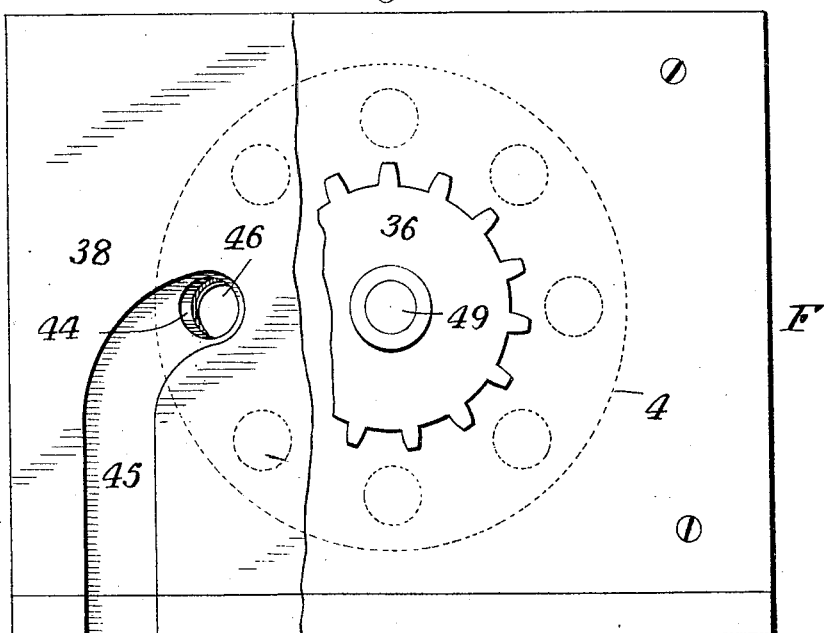

UNITED STATES PATENT OFFICE.

FREDERICK TIEMANN, OF ORDWAY, COLORADO.

SUGAR-BEET SEEDER.

No. 809,233.                    Specification of Letters Patent.                    Patented Jan. 2, 1906.

Application filed May 1, 1905. Serial No. 258,319.

*To all whom it may concern:*

Be it known that I, FREDERICK TIEMANN, a citizen of the United States, residing at Ordway, in the county of Otero and State of Colorado, have invented certain new and useful Improvements in Sugar-Beet Seeders, of which the following is a specification.

My invention relates to planters; and it consists in certain parts and their construction and arrangement whereby to especially adapt the planter for planting sugar-beet seeds, as fully set forth hereinafter and as illustrated in the accompanying drawings, in which—

Figure 1:
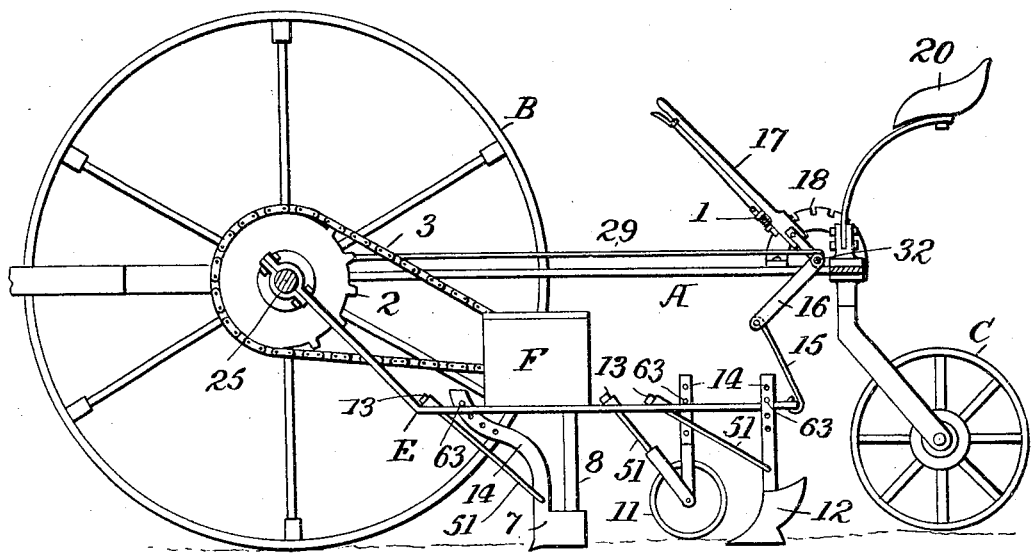
Figure 2:
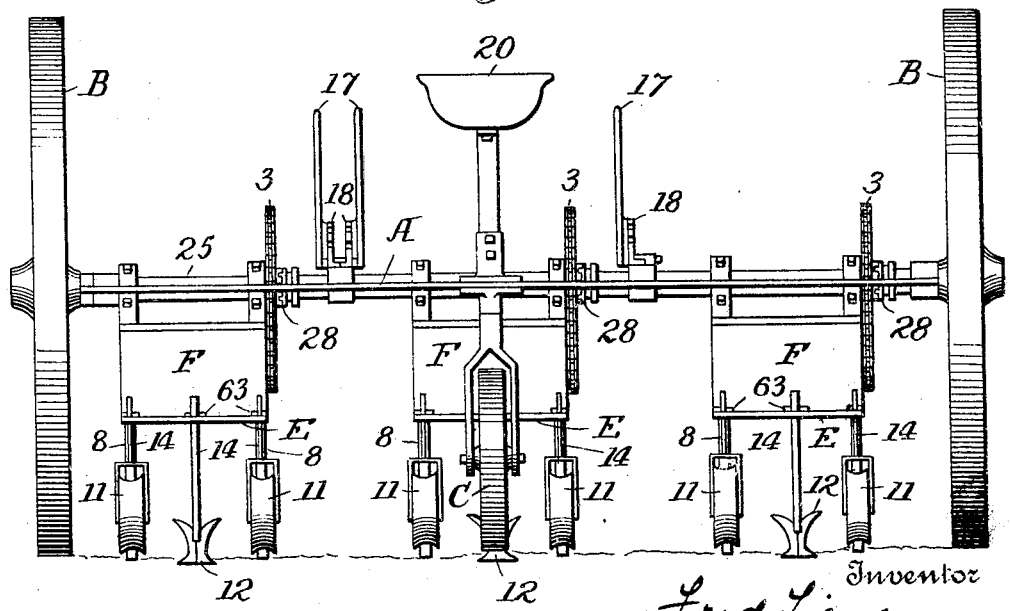
Figure 4:
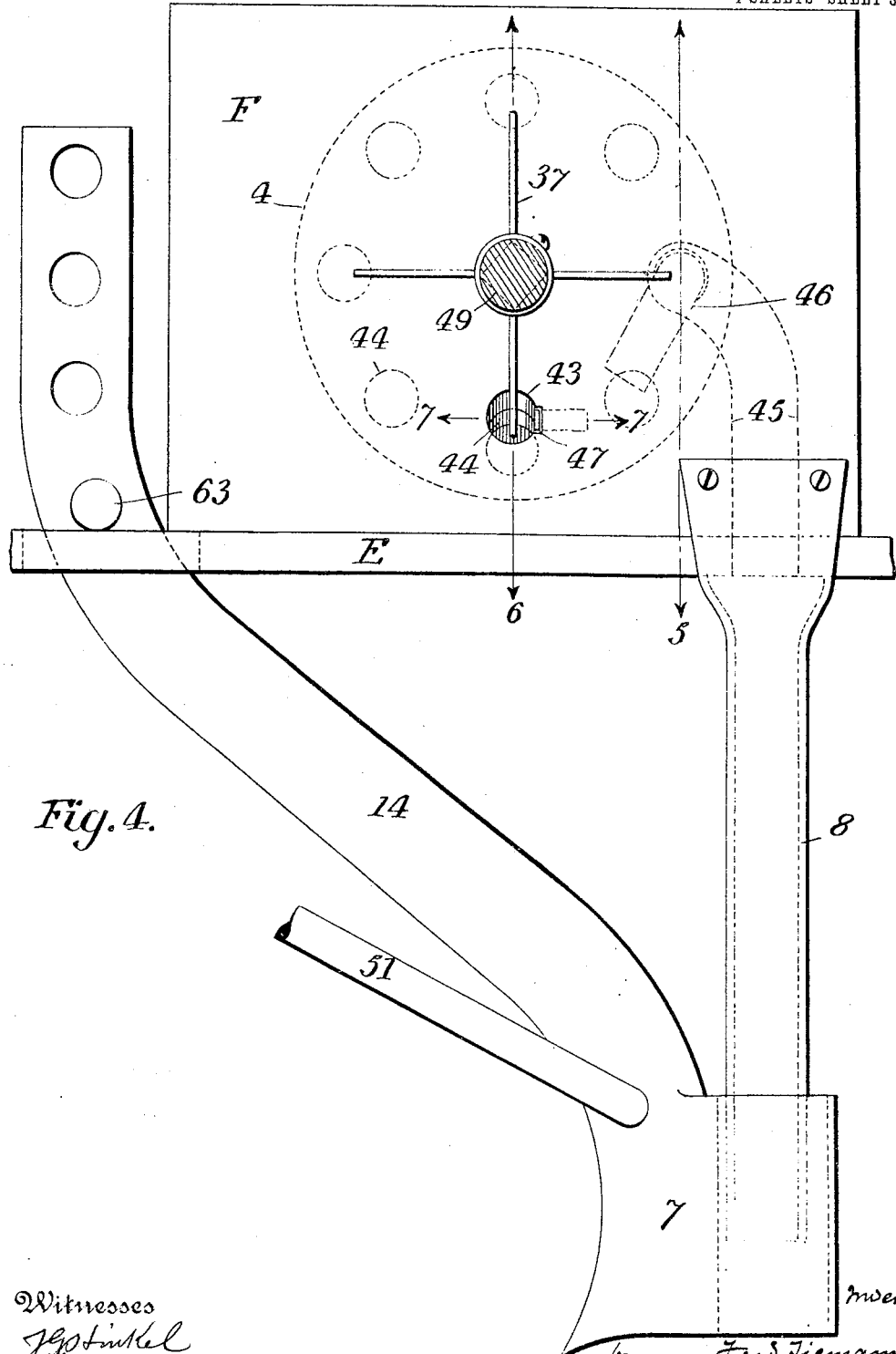

Figure 1 is a longitudinal sectional elevation of a beet-seed planter embodying my improvement. Fig. 2 is a rear elevation; Fig. 3, a plan view; Fig. 4, an enlarged end view of the seedbox and its adjuncts; Fig. 5, a section on the line 5 5, Fig. 4; Fig. 6, a section on the line 6 6, Fig. 4; Fig. 7, a section on the line 7 7, Fig. 4; Fig. 8, an end view of the opposite end of the seedbox, and Fig. 9 a perspective view of the seedbox with the cover removed.

The frame A of the machine is of any suitable construction and is supported by the driving-wheels B B and steering-wheels C, the axle 25 being connected to turn with the driving-wheels in any suitable manner. To the frame A are hung supplementary frames E, and, as shown, the said frames are provided with clips encircling the axle or shaft 25 and swing about the latter, so that the seed-distributing mechanisms carried by the supplementary frame may be driven from sprockets 2 upon the shaft 25 through the medium of chains 3 or through any other suitable gearing, so as to operate regardless of the positions which the supplemental frames may occupy. Each frame E is connected at the rear end by a link 15 with the arm 16 of a rock-shaft 32, which may be swung by a hand-lever 17 to raise and lower the supplemental frame, said lever being provided with a hand-bolt 1, engaging a toothed segment 18, whereby the lever may be held in any position to which it is carried, the lever 17 being accessible from the driver's seat 20.

As it is not desirable to operate the distributing mechanism when the frames E are lifted, a suitable clutch device 28 for connecting the sprockets to and disconnecting them from the driving-shaft is combined with means whereby the clutch may be uncoupled when the frame E is raised. As shown, there is a lever 30 engaging the clutch device and actuated by a spring 40 to maintain the clutch-sections in engagement, and a rod 29 extends from the other end of the lever to an arm 41 on the rock-shaft 32, so that when the latter is rocked to raise the frame E the lever 30 will be swung to separate the clutch-sections.

Each frame E carries a seedbox F, from which the seed is distributed, as hereinafter described, to a conduit 8, extending downward to the rear of a plow 7, and in the construction shown there are two conduits to each box, one extending downward from each end and at the rear of the frame, and at the center is a plow 12, which will make a furrow between the two rows made by the plows 7 for the reception of water when artificial irrigating is employed. Where such irrigation is not necessary, the plow 12 may be omitted. Closely behind each plow 7 is a wheel 11, with a grooved or curved rim of such width that it will tend to carry the earth back into the furrow made by the plow 7 and cover the seed which has fallen through the conduit 8.

The plows and covering-wheels may be carried to any suitable height by means of the hand-levers 17 and may be set in position by means of the bolts 1 taking into the segment 18; but for relative adjustment each of the said parts has a stem 14 extending through the frame E and perforated for the passage of transverse securing-pins 63, by means of which either one of the said parts may be held in any position to which it is adjusted.

The plows and the covering-wheels may be braced by braces 51, extending diagonally forward through openings in the frame and threaded at their upper ends and provided with nuts 13.

The seed-distributing mechanism of each box is operated from a shaft 49, extending centrally through the box and provided with a sprocket-pinion 36, engaged by the chain 3.

Each end piece 38 of the box has near the bottom a port 43, and the bottom of the box is inclined from the center downward toward each end and also from each side downward at each end and toward the ports 43 to cause the seed to be directed by gravity to these ports, the flow of the seeds to the ports being facilitated by blades 37, extending radially from the shaft 49. From each port 43 the seed passes to pockets 44 in a flat disk or distributing-wheel 4, the inner face of which lies against the outer face of the end piece 38 of the box, the pockets 44 being arranged a suitable distance apart and so that they are successively brought opposite the port 43.

As the pockets 44 extend completely through the disk 4, they are closed at the outer ends by a closing-plate 39, and a preferable construction consists in making this plate of such thickness that a circular recess may be formed therein which will just receive the disk 4, which is therefore completely inclosed by the said plate, and a cap-plate may be arranged at the outside of the closing-plate 39, the shaft 49 passing through the said parts and the disk 4 being secured to turn with the said shaft. In the plate 39 there is also formed a channel 45, the upper end of which is in such a position that the pockets 44 are brought successively opposite the same, as shown in Fig. 5, the lower end of the channel being above the conduit 8, as shown in dotted lines, Fig. 4.

Preferably the port 43 and the pockets 44 instead of passing through the end of the box and through the disk 4 parallel to the shaft are at an angle thereto, as shown in Fig. 6, so that the seed shall pass by gravity from the port 43 to the pockets and from each pocket to the channel 45, as indicated in Fig. 8. To facilitate this passage, a spring-blade 46 is bolted to the outer face of the end piece 38 in such position that it will be held nearly flat within a recess in the end piece and bearing against the inner face of the disk 4 until a pocket 44 begins to pass the spring, when the end of the latter will spring into the said pocket in the position shown in Fig. 5, thereby forcing outward any seed that are in the pocket. Another spring 47 may be set in a recess in the outer face of the end piece 38 to prevent the crushing of seeds in the pocket 44 as it passes from opposite the port 43.

By the above-described construction and arrangement of seed-distributing parts the seed are dropped intermittently and thereby the ordinary "bunching" operations required to separate the plants into successive groups is avoided, while the distributing mechanism is operated continuously.

The parts 38, 39, and 4 may be of wood or metal, and it will be seen that owing to their simple construction they may be readily manufactured and that the distributing disks or wheels 4 are so thoroughly covered as to be protected from dampness and from rusting.

While I have referred to a plurality of frames E as being connected with one main frame A, it will of course be understood that there may be but a single frame E and that but a single seed-distributing mechanism or a plurality of seed-distributing mechanisms may be mounted upon each frame E.

Without limiting myself to the precise construction and arrangement of parts shown, I claim as my invention—

1. The combination with the frame and its supporting-wheels and shaft of a planter, of a plurality of supplemental frames each connected to said shaft to swing independently, each supporting plows and seed-distributing mechanism, means for operating said mechanisms from said shaft, and independent clutch devices between the shaft and each of said means, substantially as set forth.

2. The combination with the seedbox of a planter, having a port at the end, of a seed-wheel having pockets, means for rotating it to carry said pockets past said port, a closing-plate at the opposite side of the wheel having a port, and a conduit leading downward from the latter port, substantially as set forth.

3. The combination with the seedbox of a planter having an end piece and port therein, of a shaft extending through said end, a seed-wheel with pockets secured to said shaft and rotating in contact with the outer face of said end piece, a plate in contact with the outer face of the wheel having a channel, the upper end of which is in position to coincide with the pockets, a plow, and a conduit extending from above the plow to the lower end of said channel, substantially as set forth.

4. In a seed-distributer, a box having a port at one end, a seed-wheel with pockets arranged to be brought opposite said port, a plate having a channel with which said pockets may be brought into communication, and a spring arranged adjacent said wheel to spring into each pocket as the latter passes the spring, substantially as set forth.

5. A box for a planter having an end piece with a port therein, a wheel with pockets rotating in contact with the outer face of said end piece, and a plate recessed at the inner face to receive said wheel and with a channel, the upper end of which is in position to coincide with the said pockets as the wheel revolves, substantially as set forth.

6. The combination with the frame of a planter, of a supplemental frame, a seedbox carried thereby, seed-distributing mechanism at each end of said box, and plows carried by said box, each plow on a bar adjustable vertically in said supplemental frame, substantially as set forth.

7. The combination with the main frame and driving-shaft, of the swinging seed-distributing frame, a rock-shaft, connections whereby to elevate the rear end of the seed-distributing frame, driving mechanism including a clutch device, and connections whereby the clutch device is shifted when the rock-shaft is operated to lift the seed-distributing frame, substantially as set forth.

8. The combination with the main frame, driving-shaft, swinging frame E, rock-shaft 32 connected to the frame E, and means for rocking said shaft, of sprocket-wheels loose upon the driving-shaft, sprocket-chains carried by said wheels and extending to pinions on the frames E, clutch devices for connecting the sprocket-wheels to and releasing them from the shaft, and connections whereby the clutch devices are shifted as the rock-shaft is turned, substantially as set forth.

In testimony whereof I affix my signature in presence of two witnesses.

FREDERICK TIEMANN.

Witnesses:
CHESTER K. ALLEN,
FRANK B. HARRIS.